(12) United States Patent
Hoffend, Jr. et al.

(10) Patent No.: US 9,028,108 B2
(45) Date of Patent: May 12, 2015

(54) COLLIMATING LIGHT INJECTORS FOR EDGE-LIT BACKLIGHTS

(75) Inventors: Thomas R. Hoffend, Jr., Woodbury, MN (US); David G. Freier, St. Paul, MN (US); Rolf W. Biernath, Wyoming, MN (US); Anthony J. Piekarczyk, Fridley, MN (US); Michael A. Meis, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/600,898

(22) PCT Filed: May 19, 2008

(86) PCT No.: PCT/US2008/064125
§ 371 (c)(1),
(2), (4) Date: Nov. 19, 2009

(87) PCT Pub. No.: WO2008/144650
PCT Pub. Date: Nov. 27, 2008

(65) Prior Publication Data
US 2010/0165621 A1    Jul. 1, 2010

Related U.S. Application Data

(60) Provisional application No. 60/939,082, filed on May 20, 2007.

(51) Int. Cl.
*F21V 7/09*     (2006.01)
*F21V 8/00*     (2006.01)

(52) U.S. Cl.
CPC .............. *G02B 6/0031* (2013.01); *G02B 6/0055* (2013.01); *G02B 6/0096* (2013.01)

(58) Field of Classification Search
USPC ......... 362/609, 608, 607, 617, 619, 628, 612, 362/613, 249.02, 301, 303, 298
See application file for complete search history.

(56) References Cited

U.S. PATENT DOCUMENTS 3,610,729 A   10/1971   Rogers
3,711,176 A   1/1973   Alfrey, Jr.
(Continued)

FOREIGN PATENT DOCUMENTS

DE    199 61 491    12/2000
EP    0 426 397    5/1991
(Continued)

OTHER PUBLICATIONS

3M Diffusing Film Alternative (DFA), Maximum uniformity and efficiency in flat panel displays, Brochure, 2 pages, 1996.
(Continued)

*Primary Examiner* — Jong-Suk (James) Lee
*Assistant Examiner* — Leah S Macchiarolo
(74) *Attorney, Agent, or Firm* — Steve C. Jensen; Philip Y. Dohl

(57) ABSTRACT

Illumination devices whose function are to inject light into backlights, particularly into backlights that incorporate a recycling cavity formed by a front (50) and back (52) reflector, are described. In some embodiments, the device includes a light source (59) disposed proximate the back reflector, and first (42) and second (44) reflecting structures. The first reflecting structure includes an inner reflective surface (41b) at least a portion of which is inclined to form a wedge with the back reflector. The wedge partially collimates and directs light from the light source generally away from the recycling cavity. The second reflecting structure receives light exiting the wedge and redirects such light into an injection beam directed into the recycling cavity.

15 Claims, 3 Drawing Sheets

(56) References Cited

U.S. PATENT DOCUMENTS

| | | | |
|---|---|---|---|
| 3,773,882 A | 11/1973 | Schrenk | |
| 3,884,606 A | 5/1975 | Schrenk | |
| 4,040,727 A | 8/1977 | Ketchpel | |
| 4,446,305 A | 5/1984 | Rogers | |
| 4,456,336 A | 6/1984 | Chung | |
| 4,540,623 A | 9/1985 | Im | |
| 4,791,540 A | 12/1988 | Dreyer | |
| 5,103,337 A | 4/1992 | Schrenk | |
| 5,126,880 A | 6/1992 | Wheatley | |
| 5,136,479 A | 8/1992 | Ruffner | |
| 5,337,068 A | 8/1994 | Stewart | |
| 5,360,659 A | 11/1994 | Arends | |
| 5,381,309 A | 1/1995 | Borchardt | |
| 5,440,197 A | 8/1995 | Gleckman | |
| 5,448,404 A | 9/1995 | Schrenk | |
| 5,453,855 A | 9/1995 | Nakamura | |
| 5,568,316 A | 10/1996 | Schrenk | |
| 5,594,830 A | 1/1997 | Winston | |
| 5,751,388 A | 5/1998 | Larson | |
| 5,771,328 A | 6/1998 | Wortman | |
| 5,793,456 A | 8/1998 | Broer | |
| 5,816,677 A | 10/1998 | Kurematsu | |
| 5,825,543 A | 10/1998 | Ouderkirk | |
| 5,828,488 A | 10/1998 | Ouderkirk | |
| 5,845,038 A | 12/1998 | Lundin | |
| 5,867,316 A | 2/1999 | Carlson | |
| 5,882,774 A | 3/1999 | Jonza | |
| 5,965,247 A | 10/1999 | Jonza | |
| 5,971,551 A | 10/1999 | Winston | |
| 5,976,686 A | 11/1999 | Kaytor | |
| 6,019,485 A | 2/2000 | Winston | |
| 6,036,328 A | 3/2000 | Ohtsuki | |
| 6,080,467 A | 6/2000 | Weber | |
| 6,122,103 A | 9/2000 | Perkins | |
| 6,157,486 A | 12/2000 | Benson, Jr. | |
| 6,157,490 A | 12/2000 | Wheatley | |
| 6,210,785 B1 | 4/2001 | Weber | |
| 6,262,842 B1 | 7/2001 | Ouderkirk | |
| 6,264,336 B1 * | 7/2001 | Epstein et al. | 359/606 |
| 6,267,492 B1 | 7/2001 | Reid | |
| 6,276,803 B1 | 8/2001 | Aoyama | |
| 6,280,063 B1 | 8/2001 | Fong | |
| 6,282,821 B1 | 9/2001 | Freier | |
| 6,354,709 B1 | 3/2002 | Campbell | |
| 6,367,941 B2 | 4/2002 | Lea | |
| 6,368,699 B1 | 4/2002 | Gilbert | |
| 6,454,452 B1 | 9/2002 | Sasagawa | |
| 6,531,230 B1 | 3/2003 | Weber | |
| 6,566,689 B2 | 5/2003 | Hoelen | |
| 6,600,175 B1 | 7/2003 | Baretz | |
| 6,636,283 B2 | 10/2003 | Sasagawa | |
| 6,663,262 B2 | 12/2003 | Boyd | |
| 6,673,425 B1 | 1/2004 | Hebrink | |
| 6,738,349 B1 | 5/2004 | Cen | |
| 6,762,743 B2 | 7/2004 | Yoshihara | |
| 6,783,349 B2 | 8/2004 | Neavin | |
| 6,788,358 B1 * | 9/2004 | Kim et al. | 349/62 |
| 6,809,892 B2 | 10/2004 | Toyooka | |
| 6,814,456 B1 * | 11/2004 | Huang et al. | 362/30 |
| 6,846,089 B2 | 1/2005 | Stevenson | |
| 6,893,135 B2 | 5/2005 | Wright | |
| 6,895,164 B2 | 5/2005 | Saccomanno | |
| 6,905,212 B2 | 6/2005 | Pate | |
| 6,905,220 B2 | 6/2005 | Wortman | |
| 6,917,399 B2 | 7/2005 | Pokorny | |
| 6,937,303 B2 | 8/2005 | Jang | |
| 6,974,229 B2 | 12/2005 | West | |
| 6,975,455 B1 | 12/2005 | Kotchick | |
| 7,009,343 B2 | 3/2006 | Lim | |
| 7,052,168 B2 | 5/2006 | Epstein | |
| 7,072,096 B2 | 7/2006 | Holman | |
| 7,164,836 B2 | 1/2007 | Wright | |
| 7,178,965 B2 | 2/2007 | Parker | |
| 7,220,026 B2 | 5/2007 | Ko | |
| 7,220,036 B2 | 5/2007 | Yi | |
| 7,223,005 B2 | 5/2007 | Lamb | |
| 7,229,198 B2 | 6/2007 | Sakai | |
| 7,277,609 B2 | 10/2007 | Cassarly | |
| 7,285,802 B2 | 10/2007 | Ouderkirk | |
| 7,296,916 B2 | 11/2007 | Ouderkirk | |
| 7,317,182 B2 | 1/2008 | Schultz | |
| 7,320,538 B2 | 1/2008 | Ko | |
| 7,329,982 B2 | 2/2008 | Conner | |
| 7,364,342 B2 | 4/2008 | Parker | |
| 7,416,309 B2 | 8/2008 | Ko | |
| 7,436,469 B2 | 10/2008 | Gehlsen | |
| 7,436,996 B2 | 10/2008 | Ben-Chorin | |
| 7,446,827 B2 | 11/2008 | Ko | |
| 7,481,563 B2 | 1/2009 | David | |
| 7,513,634 B2 * | 4/2009 | Chen | 362/97.1 |
| 7,525,126 B2 | 4/2009 | Leatherdale | |
| 7,604,381 B2 | 10/2009 | Hebrink | |
| 7,607,814 B2 | 10/2009 | Destain | |
| 7,660,509 B2 | 2/2010 | Bryan | |
| 7,695,180 B2 | 4/2010 | Schardt | |
| 7,740,387 B2 | 6/2010 | Schultz | |
| 7,773,834 B2 | 8/2010 | Ouderkirk | |
| 2001/0030857 A1 | 10/2001 | Futhey | |
| 2002/0060907 A1 | 5/2002 | Saccomanno | |
| 2002/0070914 A1 | 6/2002 | Bruning | |
| 2002/0141194 A1 | 10/2002 | Wortman | |
| 2002/0159019 A1 | 10/2002 | Pokorny | |
| 2002/0175632 A1 | 11/2002 | Takeguchi | |
| 2003/0043567 A1 | 3/2003 | Hoelen | |
| 2003/0086680 A1 | 5/2003 | Saccomanno | |
| 2003/0202363 A1 | 10/2003 | Adachi | |
| 2004/0061814 A1 | 4/2004 | Kim | |
| 2004/0066651 A1 | 4/2004 | Harumoto | |
| 2004/0119908 A1 | 6/2004 | Sakai | |
| 2004/0196667 A1 | 10/2004 | Lea | |
| 2004/0219338 A1 | 11/2004 | Hebrink | |
| 2005/0007756 A1 | 1/2005 | Yu | |
| 2005/0007758 A1 | 1/2005 | Lee | |
| 2005/0063195 A1 | 3/2005 | Kawakami | |
| 2005/0073825 A1 | 4/2005 | Kuo | |
| 2005/0135115 A1 | 6/2005 | Lamb | |
| 2005/0135117 A1 | 6/2005 | Lamb | |
| 2005/0200295 A1 | 9/2005 | Lim | |
| 2005/0243576 A1 | 11/2005 | Park | |
| 2005/0265029 A1 | 12/2005 | Epstein | |
| 2005/0265042 A1 | 12/2005 | Kim | |
| 2005/0265046 A1 | 12/2005 | Liu | |
| 2005/0280756 A1 | 12/2005 | Kim | |
| 2005/0285133 A1 | 12/2005 | Hung | |
| 2005/0286264 A1 | 12/2005 | Kim | |
| 2006/0002141 A1 | 1/2006 | Ouderkirk | |
| 2006/0005620 A1 | 1/2006 | Koike | |
| 2006/0028817 A1 | 2/2006 | Parker | |
| 2006/0082700 A1 | 4/2006 | Gehlsen | |
| 2006/0103777 A1 | 5/2006 | Ko | |
| 2006/0124918 A1 | 6/2006 | Miller | |
| 2006/0131601 A1 | 6/2006 | Ouderkirk | |
| 2006/0146562 A1 | 7/2006 | Ko | |
| 2006/0146566 A1 | 7/2006 | Ko | |
| 2006/0152943 A1 | 7/2006 | Ko | |
| 2006/0187650 A1 | 8/2006 | Epstein | |
| 2006/0193577 A1 | 8/2006 | Ouderkirk | |
| 2006/0210726 A1 | 9/2006 | Jones | |
| 2006/0220040 A1 | 10/2006 | Suzuki | |
| 2006/0221610 A1 | 10/2006 | Chew | |
| 2006/0250542 A1 | 11/2006 | Liu | |
| 2006/0250707 A1 | 11/2006 | Whitney | |
| 2006/0257678 A1 | 11/2006 | Benson | |
| 2006/0262564 A1 | 11/2006 | Baba | |
| 2006/0268554 A1 | 11/2006 | Whitehead | |
| 2006/0284569 A1 | 12/2006 | Wey | |
| 2006/0290842 A1 | 12/2006 | Epstein | |
| 2006/0290844 A1 | 12/2006 | Epstein | |
| 2007/0008722 A1 | 1/2007 | Fujino | |
| 2007/0024994 A1 | 2/2007 | Whitney | |
| 2007/0047228 A1 | 3/2007 | Thompson | |
| 2007/0047254 A1 | 3/2007 | Schardt | |
| 2007/0047262 A1 | 3/2007 | Schardt | |
| 2007/0081330 A1 | 4/2007 | Lee | |

(56) References Cited

U.S. PATENT DOCUMENTS

| | | |
|---|---|---|
| 2007/0091641 A1 | 4/2007 | Lin |
| 2007/0092728 A1 | 4/2007 | Ouderkirk |
| 2007/0147037 A1 | 6/2007 | Wang |
| 2007/0153162 A1 | 7/2007 | Wright |
| 2007/0153384 A1 | 7/2007 | Ouderkirk |
| 2007/0153548 A1 | 7/2007 | Hamada |
| 2007/0171676 A1* | 7/2007 | Chang ............... 362/613 |
| 2007/0189032 A1* | 8/2007 | Chang ............... 362/600 |
| 2007/0223245 A1 | 9/2007 | Lee |
| 2007/0257266 A1 | 11/2007 | Leatherdale |
| 2007/0257270 A1 | 11/2007 | Lu |
| 2007/0258241 A1 | 11/2007 | Leatherdale |
| 2007/0258246 A1 | 11/2007 | Leatherdale |
| 2008/0002256 A1 | 1/2008 | Sasagawa |
| 2008/0025045 A1 | 1/2008 | Mii |
| 2008/0049419 A1 | 2/2008 | Ma |
| 2008/0057277 A1 | 3/2008 | Bluem |
| 2010/0156953 A1 | 6/2010 | Nevitt |
| 2010/0165001 A1 | 7/2010 | Savvateev |
| 2010/0165660 A1 | 7/2010 | Weber |
| 2010/0238686 A1 | 9/2010 | Weber |
| 2010/0315832 A1 | 12/2010 | Pijlman |
| 2011/0051047 A1 | 3/2011 | O'Neill |
| 2011/0075398 A1 | 3/2011 | Wheatley |
| 2011/0096529 A1 | 4/2011 | Wheatley |
| 2011/0134659 A1 | 6/2011 | Aastuen |

FOREIGN PATENT DOCUMENTS

| | | |
|---|---|---|
| EP | 0 650 010 | 4/1995 |
| EP | 1 070 913 | 1/2001 |
| EP | 1 376 708 | 1/2004 |
| EP | 1 333 705 | 8/2004 |
| EP | 1 640 756 | 3/2006 |
| EP | 1 837 701 | 9/2007 |
| EP | 1 942 302 | 9/2008 |
| JP | 09-005737 | 1/1997 |
| JP | 11-72625 | 3/1999 |
| JP | 2004-031180 | 1/2004 |
| JP | 2004-055430 | 2/2004 |
| JP | 2004-071576 | 3/2004 |
| JP | 2004-087973 | 3/2004 |
| JP | 2004-158336 | 6/2004 |
| JP | 2004-171947 | 6/2004 |
| JP | 2004-342429 | 12/2004 |
| JP | 2005-093147 | 4/2005 |
| JP | 2005-173546 | 6/2005 |
| JP | 2005-292546 | 10/2005 |
| JP | 2005-327682 | 11/2005 |
| JP | 2006-221922 | 8/2006 |
| JP | 2006-269364 | 10/2006 |
| JP | 2006-269365 | 10/2006 |
| JP | 2008-060061 | 3/2008 |
| TW | M259185 | 3/2005 |
| TW | 2006-36353 | 10/2006 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01726 | 1/1997 |
| WO | WO 99/36248 | 7/1999 |
| WO | WO 99/36262 | 7/1999 |
| WO | WO 99/39224 | 8/1999 |
| WO | WO 00/43815 | 7/2000 |
| WO | WO 02/097324 | 12/2002 |
| WO | WO 2004/031818 | 4/2004 |
| WO | WO 2006/010249 | 2/2006 |
| WO | WO 2006/043344 | 4/2006 |
| WO | WO 2006/125174 | 11/2006 |
| WO | WO 2008/144636 | 11/2008 |
| WO | WO 2008/144644 | 11/2008 |
| WO | WO 2008/144656 | 11/2008 |
| WO | WO 2008/146229 | 12/2008 |
| WO | WO 2008/147753 | 12/2008 |
| WO | WO 2009/100307 | 8/2009 |
| WO | WO 2009/105450 | 8/2009 |

OTHER PUBLICATIONS

Denker et al., 45.1: Invited Paper: Advanced Polarizer Film for Improved Performance of Liquid Crystal Displays, 3 pages, SID 2006.

Freyssinier et al., "Evaluation of light emitting diodes for signage applications", Third International Conference of Solid State Lighting, Proceedings of SPIE, 5187, 309-317, 2004.

Kalantar and Okada, "RGB-LED Backlighting Monitor/TV for Reproduction of Images in Standard and Extended Color Spaces", FMC10-3, pp. 683-686, International Display Workshop, 2004.

Macleod, H.A., Thin-film optical filters, Second Edition, Title Page and Table of Contents, MacMillan Publishing Co., New York, 1986.

Stover, Carl PhD, Advanced Polarizer Film for Improved Performance of Liquid Crystal Displays, 10 pages, Presented at the Society for Information Displays International Conference, San Francisco, CA, Jun. 4-9, 2006.

TCO 05 (The Swedish Confederation of Professional Employees, version 2.0, Sep. 21, 2005, p. 9.

Thelan, Design of Optical Interference Coatings, McGraw Hill, Inc., Title Page, Table of Contents, and Preface, 5 pages, 1989.

Video Electronics Standards Association (VESA), Flat Panel Display Measurements Standard, v. 2.0, Jun. 1, 2001.

Weber et al., "Giant Birefringent Optics in Multilayer Polymer Mirrors", Science, vol. 287, Mar. 2000.

Vikuiti™ Display Enhancement Brochure, Vikuiti™ Brightness Enhancement Film (BEF) II, 2 pages, Copyright © 3M IPC, 2002.

Vikuiti™ Display Enhancement Brochure, Vikuiti™ Brightness Enhancement Film—Diffuse 400 (DBEF-D400), 2 pages, Copyright ©, 2004.

Vikuiti™ Display Enhancement Brochure, Vikuiti™ Dual Brightness Enhancement Film—Diffuse 550 (DBEF-D550), 2 pages, © 3M 2004.

U.S. Appl. No. 61/030,767, entitled "Backlights Having Selected Output Light Flux Distributions and Display Systems Using Same", filed Feb. 22, 2008.

U.S. Appl. No. 61/026,876, entitled "Hollow Backlight with Structured Films", filed Feb. 7, 2008.

U.S. Appl. No. 60/939,085, entitled "Recycling Backlights with Semi-specular Components", filed May 20, 2007.

U.S. Appl. No. 60/939,084, entitled "Thin Hollow Backlights with Beneficial Design Characteristics", filed May 20, 2007.

U.S. Appl. No. 60/939,083, entitled "White Light Backlights and the Like with Efficient Utilization of Colored LED Sources", filed May 20, 2007.

U.S. Appl. No. 60/939,079, entitled "Backlight and Display System Using Same", filed May 20, 2007.

U.S. Appl. No. 60/744,112, entitled "Wide Angle Mirror System", filed Mar. 31, 2006.

U.S. Appl. No. 60/978,304, entitled "Light Emitting Diode with Bonded Semiconductor Wavelength Converter", filed Oct. 8, 2007.

Search Report for International Application No. PCT/US2008/064125, 5 pgs.

Written Opinion for International Application No. PCT/US2008/064125, 6 pgs.

Cai et al., "Reflectors for Efficient and Uniform Distribution of Radiation for Lighting and Infrared Based on Non-Imaging Optics", SPIE, vol. 1528, pp. 118-128, 1991.

Collares-Pereira et al., "High Concentration Two-Stage Optics for Parabolic Trough Solar Collectors with Tubular Absorber and Large Rim Angle", Solar Energy, vol. 47, No. 6, pp. 457-466, 1991.

Baker et al., *Daylighting in Architecture: A European Reference Book*, pp. 4.3-4.5 1993.

Blanco et al., "Asymmetric CPC Solar Collectors with Tubular Receiver: Geometric Characteristics and Optimal Configurations", Solar Energy, vol. 37, No. 1, pp. 49-54, 1986.

Hung et al., Novel Design for LED Lens and Backlight System, pp. 476-479, IDMC 2007 Taipei, Taiwan.

(56) References Cited

OTHER PUBLICATIONS

Tripanagnostopoulos, Y. and Souliotis, M., "Intergrated collector storage solar systems with asymmetric CPC reflectors", Renewable Energy, vol. 29, pp. 223-248, www.sciencedirect.com, 2004.

Winston et al., *Nonimaging Optics*, Title Page & Table of Contents, Elsevier Academic Press, Amsterdam, 2005.

U.S. Appl. No. 61/058,780, entitled "Hollow Backlight with Tilted Light Source", filed Jun. 4, 2008.

U.S. Appl. No. 61/013,782, entitled "Optical Article", filed Dec. 14, 2007.

Search Report ROC (Taiwan) Patent Application No. 097118434, Date of Search: May 23, 2013, 1 page.

\* cited by examiner

COLLIMATING LIGHT INJECTORS FOR EDGE-LIT BACKLIGHTS

CROSS REFERENCE TO RELATED APPLICATIONS

This application is a national stage filing under 35 U.S.C. §371 of PCT/US2008/064125, filed on May 19, 2008, which claims priority to U.S. Provisional Application No. 60/939,082, filed on May 20, 2007,the disclosure of which is incorporated by reference in its/their entirety herein.

FIELD

The present invention relates to extended area light sources suitable for illuminating a display or other graphic from behind, commonly referred to as backlights. The invention also relates to techniques for injecting light into such backlights and into similar extended area light sources.

BACKGROUND

Historically, simple backlight devices included only three main components: light sources or lamps, a back reflector, and a front diffuser. Such systems are still in use for general purpose advertising signs and for indoor lighting applications.

Today, backlight devices and other extended area sources come in a wide variety of designs, some of which include many additional components besides the three mentioned above. The growth in the backlight industry has been due largely to the growth in the consumer electronics industry for products that incorporate liquid crystal displays (LCDs), such as computer monitors, television monitors, mobile phones, digital cameras, pocket-sized MP3 music players, personal digital assistants (PDAs), and other hand-held devices.

Although some of these consumer products can use ordinary ambient light to view the display, most include a backlight to make the display visible. In the case of LCD devices, this is because an LCD panel is not self-illuminating, and thus is usually viewed using an illumination assembly or backlight. The backlight is situated on the opposite side of the LCD panel from the viewer, such that light generated by the backlight passes through the LCD to reach the viewer. The backlight incorporates one or more light sources, such as cold cathode fluorescent lamps (CCFLs) or light emitting diodes (LEDs), and distributes light from the sources over an output area that matches the viewable area of the LCD panel. Light emitted by the backlight desirably has sufficient brightness and sufficient spatial uniformity over the output area of the backlight to provide the user with a satisfactory viewing experience of the image produced by the LCD panel.

LCD panels, because of their method of operation, utilize only one polarization state of light, and hence for LCD applications it may be important to know the backlight's brightness and uniformity for light of the correct or useable polarization state, rather than simply the brightness and uniformity of light that may be unpolarized. In that regard, with all other factors being equal, a backlight that emits light predominantly or exclusively in the useable polarization state is more efficient in an LCD application than a backlight that emits unpolarized light. Nevertheless, backlights that emit light that is not exclusively in the useable polarization state, even to the extent of emitting randomly polarized light, are still fully useable in LCD applications, since the non-useable polarization state can be easily eliminated by an absorbing polarizer provided at the back of the LCD panel.

Backlights can be considered to fall into one of two categories depending on where the internal light sources are positioned relative to the output area of the backlight, where the backlight "output area" corresponds to the viewable area or region of the display device. The "output area" of a backlight is sometimes referred to herein as an "output region" or "output surface" to distinguish between the region or surface itself and the area (the numerical quantity having units of square meters, square millimeters, square inches, or the like) of that region or surface.

The first category is "edge-lit." In an edge-lit backlight, one or more light sources are disposed—from a plan-view perspective—along an outer border or periphery of the backlight construction, generally outside the area or zone corresponding to the output area. Often, the light source(s) are shielded from view by a frame or bezel that borders the output area of the backlight. The light source(s) typically emit light into a component referred to as a "light guide," particularly in cases where a very thin profile backlight is desired, as in laptop computer displays. The light guide is a clear, solid, and relatively thin plate whose length and width dimensions are on the order of the backlight output area. The light guide uses total internal reflection (TIR) to transport or guide light from the edge-mounted lamps across the entire length or width of the light guide to the opposite edge of the backlight, and a non-uniform pattern of localized extraction structures is provided on a surface of the light guide to redirect some of this guided light out of the light guide toward the output area of the backlight. Such backlights typically also include light management films, such as a reflective material disposed behind or below the light guide, and a reflective polarizing film and prismatic BEF film(s) disposed in front of or above the light guide, to increase on-axis brightness.

The second category is "direct-lit." In a direct-lit backlight, one or more light sources are disposed—from a plan-view perspective—substantially within the area or zone corresponding to the output area, normally in a regular array or pattern within the zone. Alternatively, one can say that the light source(s) in a direct-lit backlight are disposed directly behind the output area of the backlight. A strongly diffusing plate is typically mounted above the light sources to spread light over the output area. Again, light management films, such as a reflective polarizer film, and prismatic BEF film(s), can also be placed atop the diffuser plate for improved on-axis brightness and efficiency.

In some cases, a direct-lit backlight may also include one or some light sources at the periphery of the backlight, or an edge-lit backlight may include one or some light sources directly behind the output area. In such cases, the backlight is considered "direct-lit" if most of the light originates from directly behind the output area of the backlight, and "edge-lit" if most of the light originates from the periphery of the output area of the backlight.

BRIEF SUMMARY

The present application discloses, inter alia, illumination devices whose function are to inject light into backlights, particularly into backlights that incorporate a recycling cavity formed by a front and back reflector, where the front reflector is partially transmissive to permit some of the light circulating in the cavity to escape through the output area of the backlight toward the viewer.

The application discloses, for example, an illumination device for injecting light into a hollow light recycling cavity formed by a front and back reflector, the front reflector being partially transmissive to provide an extended output area. The device includes a light source disposed proximate the back reflector, and first and second reflecting structures. The first reflecting structure is disposed between the front and back reflector, and has an inner reflective surface at least a portion of which is inclined to form a first wedge with the back reflector. The first wedge partially collimates and directs light from the light source generally away from the recycling cavity. The second reflecting structure is offset laterally from the extended output area, and is oriented to receive light exiting the first wedge and redirect such light into an injection beam directed into the recycling cavity.

In exemplary embodiments, the injection beam is "directional" in that its angular distribution is much more limited than a Lambertian distribution. This is referred to herein as being collimated or partially collimated. The injection beam may, for example, have an average flux deviation angle relative to a transverse plane in a range from 0 to 40 degrees or 0 to 30 degrees, where the transverse plane is parallel to the output area of the backlight.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification reference is made to the appended drawings, where like reference numerals designate like elements, and wherein.

DETAILED DESCRIPTION OF THE ILLUSTRATIVE EMBODIMENTS

Figure 1:
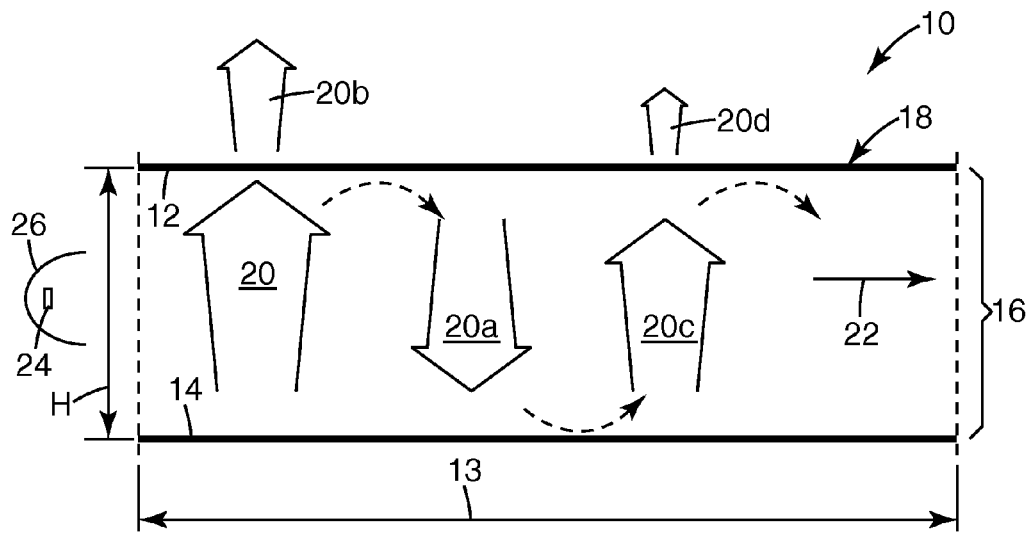
FIG. 1 is a schematic side view of a generalized recycling backlight or similar extended area source.

In FIG. 1 we see a generalized backlight 10, in which a front reflector 12 and a back reflector 14 form a recycling cavity 16. The backlight 10 emits light over an extended output area or surface 18, which in this case corresponds to an outer major surface of the front reflector 12. The front and back reflectors are shown plane and parallel to each other, and coextensive over a transverse dimension 13, which dimension also corresponds to a transverse dimension such as a length or width of the output area 18. The separation H between the front and back reflectors defines the cavity depth. The front reflector reflects a substantial amount of light incident upon it from within the cavity, as shown by an initial light beam 20 being reflected into a relatively strong reflected beam 20a and a relatively weaker transmitted beam 20b. Note that the arrows representing the various beams are schematic in nature, e.g., the illustrated propagation directions and angular distributions of the different beams are not intended to be completely accurate. Returning to the figure, reflected beam 20a is strongly reflected by back reflector 14 into a beam 20c. Beam 20c is partially transmitted by front reflector 12 to produce transmitted beam 20d, and partially reflected to produce another beam (not shown). The multiple reflections between the front and back reflectors help to support transverse propagation of light within the cavity, indicated by arrow 22. The totality of all transmitted beams 20b, 20d, and so on add together incoherently to provide the backlight output.

A small area light source 24 is shown in an edge-lit position and is provided with a reflective structure 26 to help collimate (at least partially) light from the source 24 by virtue of the inclined reflective surfaces of the structure 26 and their placement relative to the relatively small source 24. The interior of the structure 26 is preferably highly reflective, such as by lining the interior with 3M™ Vikuiti™ Enhanced Specular Reflector (ESR) film, or another specularly reflective material of high reflectivity. Reflective side surfaces (not shown, other than reflective structure 26) would typically also be provided generally at the endpoints of dimension 13, preferably connecting the front and back reflectors 12, 14 in a sealed fashion for minimum cavity losses.

Further information on exemplary recycling-cavity based backlights and components thereof can be found in the following PCT Patent Applications: "Thin Hollow Backlights With Beneficial Design Characteristics" PCT/US2008/064096; "Recycling Backlights With Semi-specular Components" PCT/US2008/064115; "White Light Backlights and the Like With Efficient Utilization of Colored LED Sources" PCT/US2008/064129; and "Backlight and Display System Using Same" PCT/US2008/064133. At least some of the backlights described in these applications have some or all of the following design features:

a recycling optical cavity in which a large proportion of the light undergoes multiple reflections between substantially coextensive front and back reflectors before emerging from the front reflector, which is partially transmissive and partially reflective;

overall losses for light propagating in the recycling cavity are kept extraordinarily low, for example, both by providing a substantially enclosed cavity of low absorptive loss, including low loss front and back reflectors as well as side reflectors, and by keeping losses associated with the light sources very low, for example, by ensuring the cumulative emitting area of all the light sources is a small fraction of the backlight output area;

a recycling optical cavity that is hollow, i.e., the lateral transport of light within the cavity occurs predominantly in air, vacuum, or the like rather than in an optically dense medium such as acrylic or glass;

in the case of a backlight designed to emit only light in a particular (useable) polarization state, the front reflector has a high enough reflectivity for such useable light to support lateral transport or spreading, and for light ray angle randomization to achieve acceptable spatial uniformity of the backlight output, but a high enough transmission into the appropriate application-useable angles to ensure application brightness of the backlight is acceptable;

the recycling optical cavity contains a component or components that provide the cavity with a balance of specular and diffuse characteristics, the component having sufficient specularity to support significant lateral light transport or mixing within the cavity, but also having sufficient diffusivity to substantially homogenize the angular distribution of steady state light within the cavity, even when injecting light into the cavity only over a narrow range of angles (and further, in the case of a backlight designed to emit only light in a particular (useable) polarization state, recycling within the cavity preferably includes a degree of randomization of reflected light polarization relative to the incident light polarization state, which allows a mechanism by which non-useable polarized light is converted into useable polarized light);

the front reflector of the recycling cavity has a reflectivity that generally increases with angle of incidence, and a transmission that generally decreases with angle of incidence, where the reflectivity and transmission are for unpolarized visible light and for any plane of incidence, and/or for light of a useable polarization state incident in a plane for which oblique light of the useable polarization state is p-polarized (and further, the front reflector has a high value of hemispheric reflectivity while also having a sufficiently high transmission of application-useable light);

light injection optics that partially collimate or confine light initially injected into the recycling cavity to propagation directions close to a transverse plane (the transverse plane being parallel to the output area of the backlight), e.g., an injection beam having an average flux deviation angle from the transverse plane in a range from 0 to 40 degrees, or 0 to 30 degrees, or 0 to 15 degrees.

Figure 2:
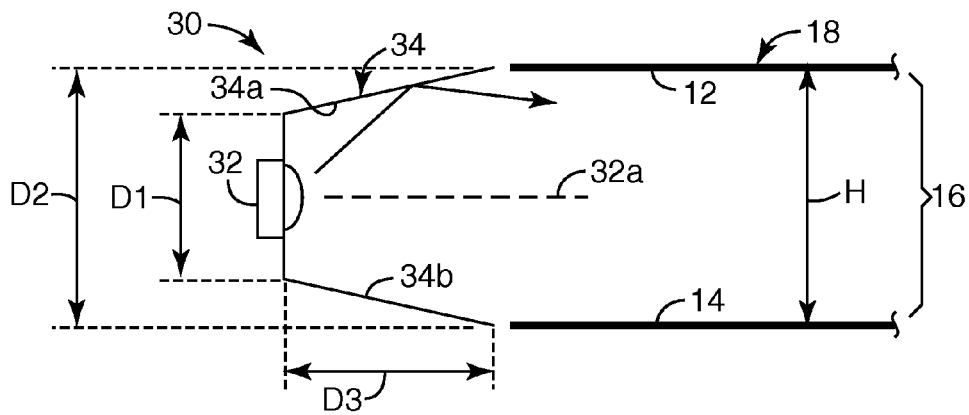
FIG. 2 is a schematic side view of a light injector disposed to inject light into a recycling cavity.
Figure 2A:
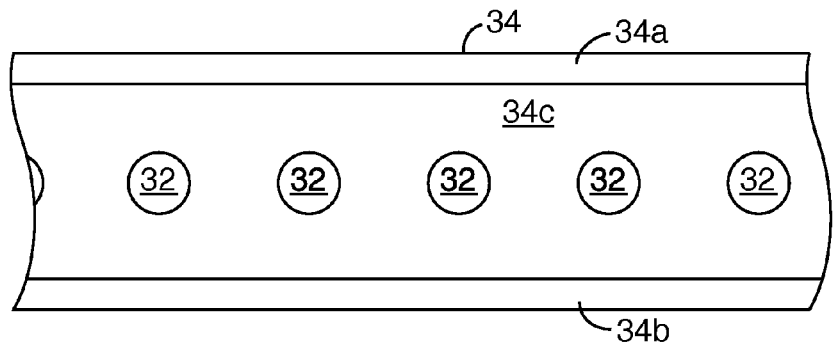
FIG. 2a is a front view of the light injector.

FIG. 2 shows a schematic side view of a different light injector 30 disposed at one end of the above-described recycling cavity 16. Like the combination of source 24 and reflective structure 26, injector 30 includes a small area light source 32 and a wedge-shaped reflective structure 34 that cooperate to inject directed light into the cavity 16. Source 32 is depicted as an LED device having an integral encapsulant lens. The lens can help provide some collimation to light emitted by the encapsulated LED die, typically directing more light (emitted in a Lambertian angular distribution from surfaces of the encapsulated LED die) closer in direction to an LED axis 32a. In the figure, the LED axis is oriented substantially parallel to the output area 18 of the backlight. The inclined reflective surfaces of the reflective structure 34 provide further collimation of emitted light, as shown by the oblique ray depicted in the figure as being reflected to a propagation direction more closely aligned with LED axis 32a. The amount of collimation provided is a function of the design variables of the wedge-like structure, i.e., the relative dimensions D1, D2, and D3 depicted in the figure, and can be tailored as desired. Note that the reflective structure 34 may have rotational symmetry about the axis 32a and thus have a conical nature, or it may be linear in form, extending along an entire open edge of the cavity 16. A front view of such a linearly extending embodiment of the light injector 30 is shown in FIG. 2a. There, the sources 32 may all be the same, e.g., all white light emitting LEDs, or they may emit different colors of light that when combined produces white light, such as with red/green/blue LED combinations.

The inner surfaces of the structure 34 are preferably highly specularly reflective to achieve the desired collimation function. Alternatively, however, different degrees of specularity or diffusivity can be provided on the different inner surfaces. This can be done to reduce or avoid the undesirable phenomenon of "headlamping." Headlamping occurs when light from the light sources is emitted from the output area of the backlight in a highly localized region in position and viewing angle. For example, note that the inclined surface 34a is disposed proximate the front reflector 12, but much of the light reflected from the surface 34a is directed downward towards the back reflector 14. On the other hand, inclined surface 34b, opposed to surface 34a, is disposed proximate the back reflector 14 but reflects a substantial amount of light upward towards the front reflector 12. In order to avoid an undesirable bright band at the edge of the output area 18 proximate the light source resulting from "one bounce" reflections of LED light from the lower inclined surface 34b, i.e., headlamping, that surface 34b can be made to have a balance of specular and diffuse characteristics to soften or spread the light striking the front reflector 12. The upper inclined surface 34a may however still have a more purely specular characteristic, resulting in an asymmetric wedge design. For information on components that provide a balance of specular and diffuse characteristics, reference is made to a PCT Patent Application referenced above, "Recycling Backlights With Semi-specular Components" PCT/US2008/064115.

In one embodiment, inclined surface 34a is covered with (or is itself) the ESR film mentioned above, and inclined surface 34b is covered with (or is itself) an embossed ESR film, the embossing providing a surface texture that has a diffusing effect. The inclined surface 34b can alternatively be segmented or divided into a first portion or strip, proximate the input end of the wedge, being highly specular as with ESR film, and an adjacent second portion or strip, proximate the output end of the wedge, being partially specular and partially diffuse, or completely diffuse. The size of the diffusive portion and the amount of diffusivity can be desirably selected to simultaneously avoid or reduce reflected image artifacts while also achieving a high optical luminous efficiency. A vertical surface 34c of the structure 34 can be diffusely reflective, e.g., 2x-TIPS film available from 3M Company.

Figure 3:
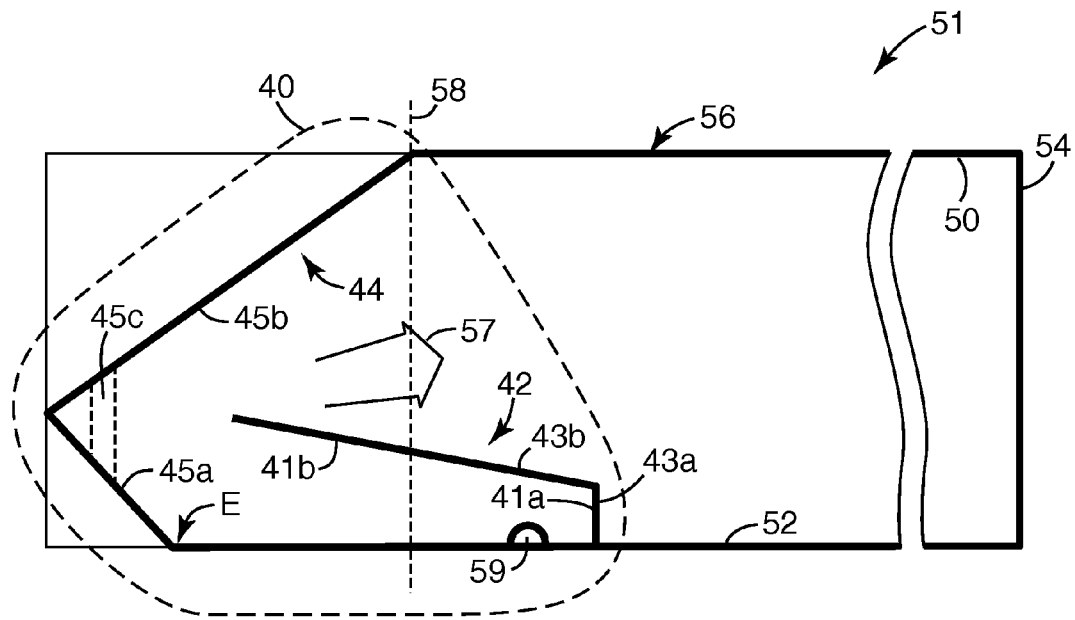
FIG. 3 is a schematic side view of another light injector.

An alternative light injector 40 is shown in FIG. 3. This injector combines two reflecting structures—first reflecting structure 42 and second reflecting structure 44—that cooperate to both collimate the LED source light, and fold the light path from the LED sources to the recycling cavity (if desired), thus permitting the sources to be repositioned to be slightly within the recycling cavity, i.e., directly behind the output area of the backlight. This repositioning beneficially reduces the width needed for the bezel or frame surrounding the output area. This repositioning also beneficially increases the mixing length of the injection wedge, which can help provide better uniformity. Because of the proximity of the light sources to the edge or boundary of the output area, designs such as the one shown in FIG. 3 may be considered to fall within the category of edge-lit backlights.

In the schematic side view of a backlight 51 shown in FIG. 3, a recycling cavity is provided between a front reflector 50 and a back reflector 52, with a vertical side reflector 54 also being provided to seal the right edge of the cavity. As before, the front reflector 50 is partially transmissive to define an output area or region 56, which terminates on one end at side reflector 54 and at the opposite end at the reference plane 58, where it abuts the second reflecting structure 44. The back reflector 52 is slightly larger in size than the front reflector, extending from the side reflector 54 on one end to an edge E at which it abuts the (asymmetrically shaped) second reflecting structure 44. One or more light sources 59, typically LEDs, are disposed on or project light through apertures in the back reflector 52.

A first reflecting structure 42 covers or shields the light sources from directly illuminating the front reflector 50. Structure 42 includes a vertical member having an inner reflective surface 41a and an outer reflective surface 43a, and connected thereto an inclined member having an inner reflective surface 41b and outer reflective surface 43b. In exemplary embodiments, the inclined and vertical members each have substantially the same reflectivity characteristics on opposed sides thereof, and the reflectivity of the inclined member can be the same as that of the vertical member such as when they have the same construction or when they are two parts of a continuous film, but alternative embodiments are also contemplated. The outer reflective surfaces 43a, 43b desirably have the same or similar reflective characteristics as the back reflector 52, since they are exposed to light being recycled within the cavity. The inner reflective surface 41b is inclined relative to the back reflector 52 so as to form a wedge therebetween. This wedge partially collimates and directs light from the light source generally away from the recycling cavity, i.e., generally to the left in the figure.

A second reflecting structure 44 is also provided that receives the light emitted by the wedge formed by the first reflecting structure, and redirects that light back into the recycling cavity, forming an injection beam depicted generally at 57. The structure 44 includes first and second inclined reflective surfaces 45a, 45b whose geometric arrangement, in conjunction with the first reflecting structure 42, are selected to provide the desired injection beam.

In some embodiments, the second reflective structure 44 can include an optional third reflective surface 45c that extends between the first and second reflective surfaces 45a, 45b. The third reflective surface 45c can be any suitable shape, e.g., planar, curved, etc. Any suitable material or materials can be used to form the third reflective surface 45c, e.g., those materials described for the first and second reflective surfaces 45a, 45b. In some embodiments, the first and second reflective surfaces 45a, 45b can be shaped to form the third reflective surface 45c.

Figure 3A:
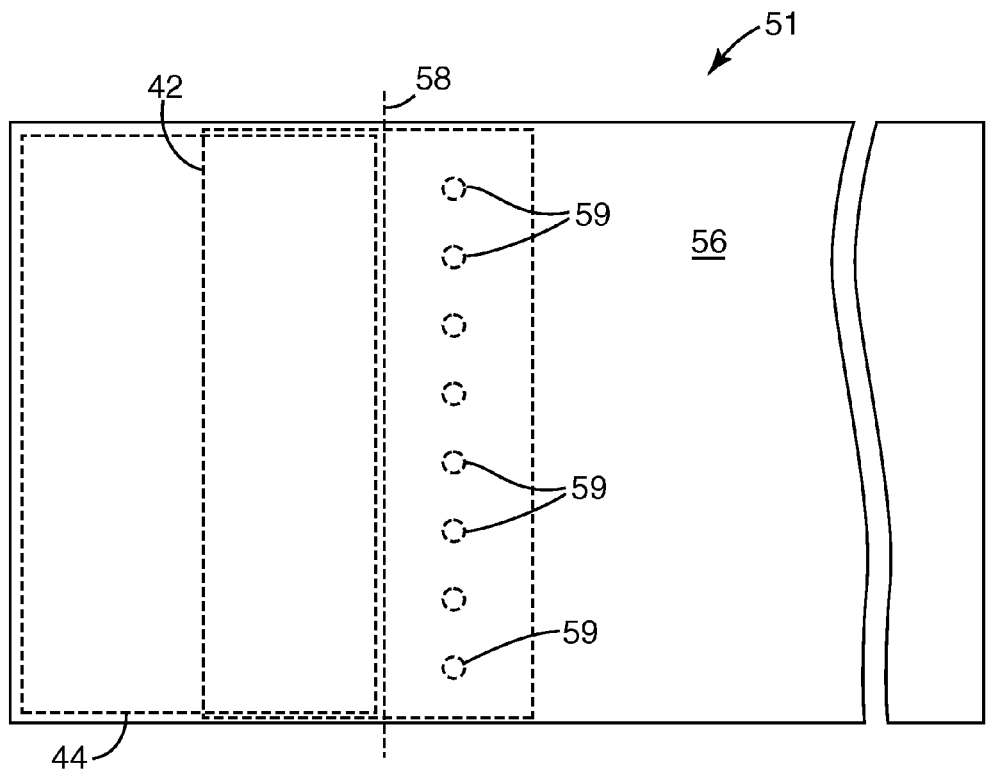
FIG. 3a is a schematic top view of same.

A top view of backlight 51 is shown in FIG. 3a. A plurality of light sources 59 are disposed in a row along an axis that is parallel to the left edge of the output area 56, such edge coinciding with the reference plane 58. The first and second reflecting structures 42, 44 likewise extend along the same axis.

In an alternative embodiment to light injector 40, the vertical member of the structure 42 can be omitted, and the inclined member can then be extended to contact the back reflector 52. Such a design alternative covers up more of the back reflector 52, but avoids the abrupt discontinuity provided by the vertical member, which may give rise to undesirable brightness variations in the output area.

The backlight 51 is depicted as a one-sided edge-lit backlight, since light sources are provided along only one edge of the output area 56. The backlight can however, readily be converted to a two-sided edge-lit backlight, by eliminating side reflector 54 and replacing it with a light injector substantially the same as light injector 40, but rotated so as to inject light properly into the recycling cavity in a direction opposite that of light injector 40. The opposed light injectors may be of the same or different designs.

Other Contemplated Features, Embodiments, and Alternatives

The disclosed extended area sources are suitable for use as a backlight for an LCD display. The backlight is preferably hollow in the sense that it consists of a hollow cavity with various objects inserted into the cavity, and/or around the cavity to serve as light-directing components. The backlight is preferably thin in the sense that the length and width dimensions of the cavity, spanning the viewing or output surface, are significantly larger than the depth of the backlight. In an exemplary embodiment, the ratio of the length of the cavity from the illuminated edge to the distal edge (for single-sided illumination) or illuminated edge to opposite illuminated edge (for two-sided illumination) to the depth of the cavity is greater than 10:1.

Light for the backlight is provided using a light source such as one or more light emitting diodes (LEDs) and/or cold cathode fluorescent lamps (CCFLs).

Preferably, light is injected into the backlight by placing the light sources inside one or more light-injection wedges. The wedge may be composed of piecewise-planar components as depicted in FIG. 3, or it may comprise non-planar components such as a partial-parabolic mirror or similarly shaped structure. The wedge may be inserted partially or completely in the backlight cavity, and/or positioned partially or completely in bezels around the edges of the cavity. The wedges are reversed in the sense that they can point from the center of the cavity towards the edges of the cavity, where "point" implies that light exiting a given wedge travels initially on average in the direction of pointing. The wedges are pointed towards reflecting structures (light redirectors) inserted at the edges of the cavity, and/or attached to the edges of the cavity or bezels around the edges of the cavity. The light redirectors can comprise multiple faceted and/or curved surfaces and/or prisms and/or lenses.

If a wedge has a distinct vertical or otherwise abrupt surface, it can be covered with an additional tapered surface that smoothes out the abrupt feature at the back of the wedge. The tapered surface does not have to be coincident with the top inclined surface of the wedge, but can be inclined at a shallower angle. The tapered surface may intersect the backlight cavity at the back reflector, or at a vertical side reflective surface.

In exemplary embodiments, each wedge is translation-invariant with respect to the edge of the cavity towards which the wedge points. Further, each light redirector and tapered smoothing surface (if present) is translation-invariant with respect to the edge towards which they respectively point.

Fill material can be used in the light redirectors to support or provide a backing for the reflective surfaces. The fill material can be an optical material such as a glass, plastic, or composite, and/or a structural material such as metal, plastic, or composite. The fill material can also be omitted and replaced with air.

In exemplary embodiments, the interior and exterior surfaces of the wedges are covered with (or are) a specular reflecting material having a high reflectivity.

In one exemplary embodiment, the front reflector of the recycling cavity is a highly reflective material with partially polarizing transmission, and the upper- or outer-most surface may also include a bead-coating, while the back reflector is a semi-specular reflecting material with high specular reflectivity and small diffuse reflectivity.

In another exemplary embodiment, the front reflector of the recycling cavity is a highly reflective material with partially or highly polarizing transmission, with a gain diffuser resting on top and set apart from the highly reflective material by an air gap, and the back reflector is a specular reflecting material having a high reflectivity.

In another exemplary embodiment, the front reflector of the recycling cavity is a highly reflective material with partially collimating transmission, with a gain diffuser resting on top and set apart from this highly reflective material by an air gap, and the back reflector is a specular reflecting material having a high reflectivity.

In addition to the described film configurations for the front and back reflector, an absorbing polarizer spaced from the top reflector by an air gap, and an LCD panel atop the absorbing polarizer, can be provided.

The back reflector of the recycling cavity can be considered to include all exterior reflective surfaces of the wedges and/or the tapered smoothing surfaces (if any) that lie inside the cavity.

Examples of specular reflecting materials having a high reflectivity include 3M multilayer optical films such as Vikuiti™ ESR. Examples of highly reflective materials with partially polarizing transmission include the multilayer reflective films described in the PCT Patent Application mentioned above, "Backlight and Display System Using Same" PCT/US2008/064133. An example of a highly reflective material with high polarizing transmission includes advanced polarizing film (APF) available from 3M Company. Examples of semi-specular reflecting material with high specular reflectivity and small diffuse reflectivity include 3M multilayer optical films such as ESR coated with a suitably chosen bead coating. An example of such a bead coating is PMMA beads, such as Sekisui MBX20 beads, in an index-matched PMMA binder coated at 20 gm/m$^2$ or 40 gm/m$^2$ with a sag of 60%. Examples of a highly reflective material with partially collimating transmission include the multilayer reflective films described in the "Backlight and Display System Using Same" patent application just mentioned. An example of a gain diffuser is Keiwa gain diffuser BS702.

Headlamping is a visual effect where light from light sources illuminating a backlight is emitted from the backlight in a highly localized spatial region of the backlight. The region of emission may lie near the exit surface(s) of the wedge(s) and/or light redirector(s). Also, the region of emission may lie in a highly localized region or regions of viewing angle. This may result in undesirable non-uniformities in backlight brightness versus position and viewing angle.

The design features of the disclosed backlights can desirably be selected to minimize or eliminate headlamping. For example, the design features can be selected to minimize non-uniformity of on-axis brightness of the backlight, and/or maximize the total on-axis brightness of the backlight given a fixed amount of source lumens, and/or minimize the width of bezels extending outside the cavity. Minimization or elimination of headlamping can be accomplished by redirecting light that would otherwise comprise an imaging or partial imaging of the source(s) away from the backlight output surface and directly into the backlight cavity, and/or into a range of near-grazing incidence angles on the front reflector. Near-grazing incidence angles refer to angles at which light is strongly reflected by the front reflector, and in some cases it can be light whose incidence angle is greater than 60 degrees.

In some cases, an edge-lit backlight or similar device requiring an extended row of many LED sources may have sufficient real estate "width" or "depth" to accommodate more than one row in parallel. For example, any of the disclosed light injectors may accommodate two rows of clustered LEDs, such as the following clustered RGGGGB LEDs:

| | | | |
|---|---|---|---|
| RGGGGB | RGGGGB | RGGGGB | RGGGGB |
| RGGGGB | RGGGGB | RGGGGB | RGGGGB. |

The rows need not be identical to each other, as in the following arrangement:

| | | | |
|---|---|---|---|
| RB | RB | RB | RB |
| GGGG | GGGG | GGGG | GGGG. |

Example 1

A first example was tested in a custom LED backlight test bed. The test bed was designed to simulate an LED-based area backlight for a 813 mm (32") diagonal, 16:9 aspect-ratio, LCD television. The hollow test bed backlight cavity had a bent sheet metal shell forming side walls and rear walls, with the long axis of the frame being placed horizontally. Slots were cut into the back reflector to allow for insertion of LED light engines. The internal cavity depth was 19 mm, with an approximately 5 mm bend radius at the back wall to side wall interface. The sheet metal used was commercial grade brushed aluminum with a thickness of 1 mm.

Figure 4:
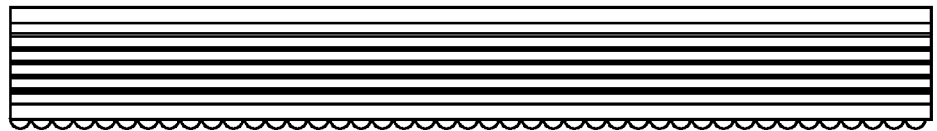
FIG. 4 is a schematic side view of a laminate stack of films used in an example.

Selected multilayer optical front reflector films were laminated to a 0.005" (0.127 mm) thick 12% Haze polycarbonate (PC) sheet using 3M OPT1™ optical transfer adhesive (3M Corp, Maplewood, Minn.). A laminate stack as illustrated in FIG. 4 was made by repeated (5 times) lamination of a multilayer optical film (MOF), hereafter referred to as TOP (thin one-packet) film (described immediately below), and 3M OPT1™ optical transfer adhesive. The final layer on the laminate stack was Keiwa Opalus™ BS-702 available from Keiwa Corp., Tokyo, Japan.

The individual TOP multilayer film, which is an asymmetric reflective film (ARF), is composed of 274 alternating microlayers of birefringent 90/10 coPEN and non-birefringent of PET-G. The 274 alternating microlayers are arranged in a sequence of ¼ wave layer pairs, where the thickness gradient of the layers is designed to provide a strong reflection resonance broadly and uniformly across bandwidth from approximated 410 nm to 940 nm wavelength for one polarization axis, and a weaker reflection resonance for the orthogonal axis. There are no skin layers on the individual multilayer optical films. The TOP film (by itself, before the 5× lamination) exhibits a pass-axis transmissivity of approximately 73%, and a block axis reflectivity of 98% or higher. The stack of 5 TOP films, laminated together (and referred to as 5×ARF), exhibits a pass axis transmissivity of about 38%. The overall thickness of the laminate or stack, including the alternating microlayers, protective boundary layers, and adhesive layers, is approximately 260 microns. The measured (at 633 nm) birefringent refractive index values for the alternating microlayers of 90/10 coPEN are $N_x=1.830$, $N_y=1.620$, and $N_z=1.500$, while those of the PET-G are $N_x=N_y=N_z=1.563$.

The low-birefringence, low haze, polycarbonate film used was 0.005" thick (0.127 mm) with a 12% haze level (Iupilon™ Film, Grade FE-2000 M05, Mitsubishi Engineering-Plastics Corp., Tokyo, Japan). In all cases it was laminated to the panel with the textured surface facing in towards the adhesive.

The plates were attached to the hollow backlight cavity such that the beaded gain diffuser faced into the hollow cavity and the polycarbonate surface formed the outermost emissive surface of the test bed. The outer surface of the plate serves as the output surface for the test bed (i.e., the output area of the backlight).

Four LED bars ("engines") were affixed to the backside, bottom edge of the cake pan. In addition, 4 LED bars were affixed to the backside, top edge of the cake pan. The bars were arranged in a single row spanning the width of the backplane. Each bar had 4 red, 2 blue, 6 green, and 6 white Lambertian Cree XR-E LEDs (Cree Inc., Durham, N.C.) arranged in a GRGBGR-WWWWWW-RGBGRG pattern in a single line on a standard flexible printed-circuit. Model numbers for the LEDs were as follows: Red (XR7090RD-L1-

0001), Green (XR7090GR-L1-0001), Blue (royal blue, XR7090RY-L1-0001), and White (XREWHT-L1-0802).

The center-to-center spacing between LEDs on a single bar was about 9.5 mm. The total length of a single light engine (bar) was 170 mm. The center-to-center pitch between light engines was approximately 175 mm.

On a single bar, the red, green, blue, and white LEDs were electrically connected in a single series. Each bar was run at 700 mA current using a current regulated power supply. Each flex circuit was thermally mounted to a heat sink using thermally conductive adhesive. Fans were used to cool the heat sinks to an approximate 50 degrees C. operating temperature at the base of the heat sink.

Figure 5:
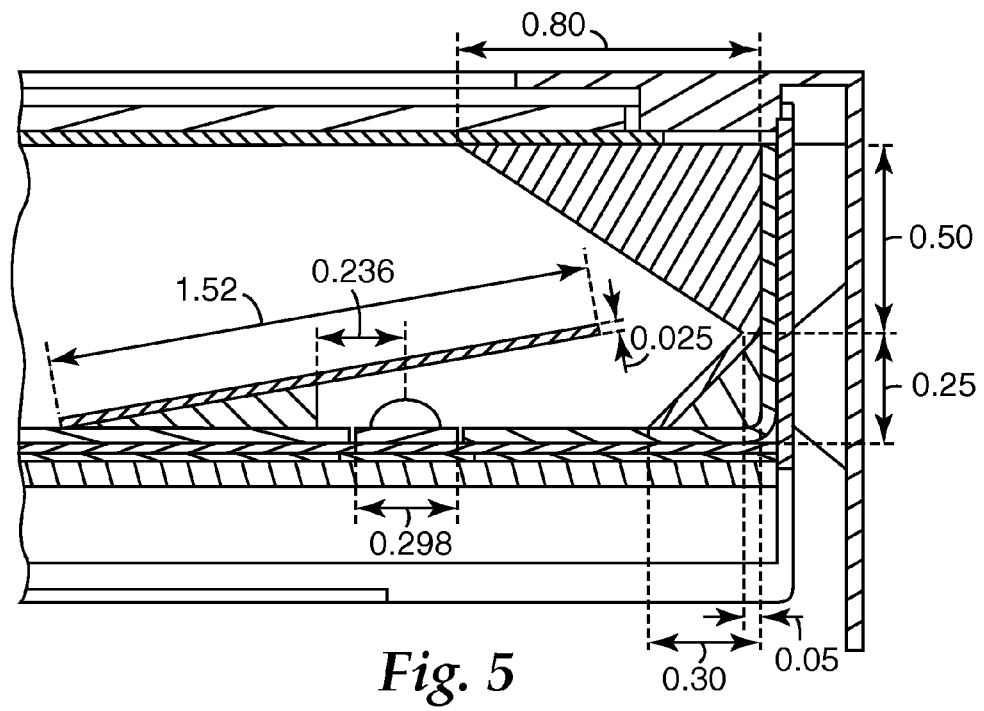
FIG. 5 is a cross-sectional view of one of the light injectors constructed for the examples.
Figure 6:
FIG. 6 is a schematic side view of the backlight, including opposed light injectors, constructed for the examples.

A light injector of the type described generally in connection with FIG. 3 above was constructed from Aluminum base material, and used to direct the light from each LED light engine into the hollow recycling cavity. This geometry of one of the light injectors is depicted in FIG. 5, where the dimensions provided in the figure are expressed in inches. FIG. 6 shows a side view of the opposed light injector arrangement used, but unlike FIG. 5, is not necessarily to scale.

The LED engines were mounted on the backside of the cavity, with the LEDs protruding somewhat into the cavity through drilled holes as illustrated in FIG. 5. The back reflector plate had holes to allow the LED lenses to extend through the plate. When mounted, the top surface of the plate was aligned with the bottom of the LED lenses.

A high-reflectivity, specular reflector film (Vikuiti™ ESR film from 3M) was laminated to all inner surfaces of the hollow cavity including the inside of the wedge and the redirector mirrors.

Thus mounted, the film layer was substantially flat on each face of the wedge and acted as a focusing or collimating reflector directing the LED light into the cavity.

The cavity was placed behind an LCD panel obtained from a Samsung 32 inch diagonal TV. The LCD panel was turned on and driven in the fully on white state. An image was collected with a Prometric digital camera. The calculated VESA-9 point uniformity was 70%. See PCT Patent Application No. PCT/US2008/064133 for a description of the VESA-9 point Standard. The average brightness was 432 cd/m². The color uniformity was very good and no bright banding or headlamping was observed.

Example 2

A second example was constructed in a similar fashion to Example 1. In this example, a 23 inch diagonal monitor was retrofitted with a hollow edgelit LED lightguide. Width and height dimensions were adjusted to fit the 23 inch diagonal monitor; however, the thickness remained 19 mm. The monitor was an Apple Cinema Display made by Apple Computer, Cupertino, Calif., and was originally backlit by CCFL bulbs. The CCFL backlight was removed as were all optical films behind the LCD.

The LEDs used in this case were OSRAM G6-SP series RGB LEDs. Configuration was GRGBGRG with 6 repeat units per light engine.

The light injector construction of Example 1 was used. The light injector had the same dimensions as in Example 1.

The LCD panel was turned on and driven in a fully on white state. An image was collected with the Prometric camera. The calculated VESA-9 point uniformity was 84%. Average brightness was 150 cd/m². The color uniformity was very good, and no bright banding was observed.

Unless otherwise indicated, references to "backlights" are also intended to apply to other extended area lighting devices that provide nominally uniform illumination in their intended application. Such other devices may provide either polarized or unpolarized outputs. Examples include light boxes, signs, channel letters, and general illumination devices designed for indoor (e.g., home or office) or outdoor use, sometimes referred to as "luminaires." Any suitable backlights can be used with the embodiments of the present disclosure, e.g., backlights that include solid light guides, edge-lit backlights, direct-lit backlights, etc. Note also that edge-lit devices can be configured to emit light out of both opposed major surfaces—i.e., both out of the "front reflector" and "back reflector" referred to above—in which case both the front and back reflectors are partially transmissive. Such a device can illuminate two independent LCD panels or other graphic members placed on opposite sides of the backlight. In that case the front and back reflectors may be of the same or similar construction.

The term "LED" refers to a diode that emits light, whether visible, ultraviolet, or infrared. It includes incoherent encased or encapsulated semiconductor devices marketed as "LEDs," whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light. An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies. An LED may also include a cup-shaped reflector or other reflective substrate, encapsulating material formed into a simple dome-shaped lens or any other known shape or structure, extractor(s), and other packaging elements, which elements may be used to produce a forward-emitting, side-emitting, or other desired light output distribution.

Unless otherwise indicated, references to LEDs are also intended to apply to other sources capable of emitting bright light, whether colored or white, and whether polarized or unpolarized, in a small emitting area. Examples include semiconductor laser devices, and sources that utilize solid state laser pumping.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Various modifications and alterations of this disclosure will be apparent to those skilled in the art without departing from the scope and spirit of this disclosure, and it should be understood that this disclosure is not limited to the illustrative embodiments set forth herein. All U.S. patents, patent application publications, unpublished patent applications, and other patent and non-patent documents referred to herein are incorporated by reference in their entireties, except to the extent any subject matter therein directly contradicts the foregoing disclosure.

What is claimed is:

1. An illumination device for injecting light into a hollow light recycling cavity formed by a front and back reflector, the front reflector being partially transmissive to provide an extended output area, the device comprising:
   a light source disposed proximate the back reflector;
   a first reflecting structure disposed between the front and back reflector, and having an inner reflective surface at least a portion of which is inclined relative to the back reflector to form a first wedge there between that partially collimates and directs light from the light source generally away from the recycling cavity; and
   a second reflecting structure that is offset laterally from the extended output area, and oriented to receive light exiting the first wedge and redirect such light into an injection beam directed into the recycling cavity.

2. The device of claim 1, wherein the light source is an LED.

3. The device of claim 1, wherein the first reflecting structure is elongated along an axis that is substantially parallel with a peripheral edge of the extended output area.

4. The device of claim 1, wherein the light source is one of a plurality of light sources arranged in a row that extends parallel to a peripheral edge of the extended output area.

5. The device of claim 4, wherein the light sources are LEDs.

6. The device of claim 5, wherein the light source is disposed proximate the back reflector and within the recycling cavity.

7. The device of claim 4, wherein the first and second reflecting structures are each elongated along an axis that is substantially parallel with the peripheral edge.

8. The device of claim 7, wherein the light source is disposed proximate the back reflector and within the recycling cavity.

9. The device of claim 1, wherein the front reflector reflects oblique-angle light more than normally incident light, and the injection beam provides more oblique-angle light than normally incident light.

10. The device of claim 9, wherein the light source is disposed proximate the back reflector and within the recycling cavity.

11. The device of claim 1, wherein the inner reflective surface also has a substantially vertical portion that connects the inclined portion to the back reflector such that the first wedge is a truncated wedge.

12. The device of claim 1, wherein a first reflecting structure has an outer reflective surface at least a portion of which is inclined relative to the back reflector.

13. The device of claim 12, wherein the inclined portion of the outer reflective surface is substantially parallel to the inclined portion of the inner reflective surface.

14. The device of claim 1, wherein the second reflecting structure has inclined reflective surfaces forming a generally concave shape.

15. The device of claim 1, wherein the light source is disposed proximate the back reflector and within the recycling cavity.

* * * * *